United States Patent
Prasad et al.

(10) Patent No.: US 10,078,502 B2
(45) Date of Patent: Sep. 18, 2018

(54) VERIFICATION OF A MODEL OF A GUI-BASED APPLICATION

(71) Applicant: FUJITSU LIMITED, Kawasaki-shi, Kanagawa (JP)

(72) Inventors: Mukul R. Prasad, San Jose, CA (US); Frolin S. Ocariza, Jr., Richmond (CA)

(73) Assignee: FUJITSU LIMITED, Kawasaki (JP)

(*) Notice: Subject to any disclaimer, the term of this patent is extended or adjusted under 35 U.S.C. 154(b) by 745 days.

(21) Appl. No.: 14/309,740

(22) Filed: Jun. 19, 2014

(65) Prior Publication Data

US 2015/0370541 A1 Dec. 24, 2015

(51) Int. Cl.
*G06F 8/38* (2018.01)
*G06N 5/04* (2006.01)
*G06F 11/28* (2006.01)

(52) U.S. Cl.
CPC .............. *G06F 8/38* (2013.01); *G06N 5/047* (2013.01); *G06F 11/28* (2013.01)

(58) Field of Classification Search
CPC ...... G06F 11/28; G06F 11/36; G06F 11/3672; G06F 8/10; G06F 8/34; G06F 11/3684; G06F 11/3688; G06F 11/3692
See application file for complete search history.

(56) References Cited

U.S. PATENT DOCUMENTS

| | | | | |
|---|---|---|---|---|
| 5,918,037 A * | 6/1999 | Tremblay | ................. | G06F 11/28 714/E11.178 |
| 6,346,879 B1 * | 2/2002 | Peled | ..................... | G06F 17/504 340/500 |
| 6,976,246 B1 * | 12/2005 | Rosaria | ..................... | G06F 8/34 714/E11.157 |
| 7,200,838 B2 * | 4/2007 | Kodosky | ................... | G06F 8/34 715/762 |
| 8,825,635 B2 * | 9/2014 | Ejsing | ................. | G06F 17/3051 707/720 |
| 2006/0085681 A1 * | 4/2006 | Feldstein | ............ | G06F 11/3684 714/25 |
| 2007/0220346 A1 * | 9/2007 | Dams | ...................... | G06F 11/28 714/38.1 |
| 2008/0256392 A1 * | 10/2008 | Garland | ............... | G06F 11/263 714/33 |

(Continued)

OTHER PUBLICATIONS

D. Peled et al., "Black Box Checking" Journal of Automata, Languages and Combinatorics Jan. 2002; 7:225-246.

(Continued)

*Primary Examiner* — Justin S Lee
(74) *Attorney, Agent, or Firm* — Maschoff Brennan (57) ABSTRACT

A method may include receiving a model of a graphical user interface (GUI) based application that includes a plurality of paths. The method may further include determining one or more paths of the plurality of paths that each include a pattern that satisfies a rule-pattern. The rule-pattern may be based on potential inaccuracies in the model as indicated by the pattern. The method may additionally include verifying whether the model is consistent with the GUI-based application. The verification may be based on a prioritization of a determination of whether the one or more paths are consistent with the GUI-based application. The prioritization of the one or more paths may be based on the one or more paths each including the pattern.

12 Claims, 9 Drawing Sheets

(56) References Cited

U.S. PATENT DOCUMENTS

| | | | |
|---|---|---|---|
| 2008/0270101 A1* | 10/2008 | Salmela | G06F 8/10 703/17 |
| 2013/0198671 A1* | 8/2013 | Kasai | G06F 3/0482 715/771 |
| 2014/0052433 A1 | 2/2014 | Prasad et al. | |
| 2014/0108496 A1* | 4/2014 | Heller | G06F 17/30864 709/203 |

OTHER PUBLICATIONS

K. Li et al., "Integration Testing of Components Guided by Incremental State Machine" In proceeding of: Testing: Academia and Industry Conference—Practice and Research Techniques (TAIC PART 2006), Aug. 29-31, 2006, Windsor, United Kingdom.

Chia Cho et al., "MACE: Model-inference-Assisted Concolic Exploration for Protocol and Vulnerability Discovery" SEC'11 Proceedings of the 20th USENIX conference on Security pp. 10-10, Aug. 8, 2011.

Choi, W., Necula, G., Sen, K.: Guided gui testing of android apps with minimal restart and approximate learning. In: Proceedings of the 2013 ACM SIGPLAN international conference on Object oriented programming systems languages & applications, pp. 623-640. ACM, Indianapolis, Indiana, USA (2013).

Edmund M. Clarke "The Birth of Model Checking" 25 Years of Model Checking, Jan. 1, 2008.

Ali Mesbah et al., "Crawling Ajax-Based Web Applications through Dynamic Analysis of User Interface State Changes" ACM Transactions on the Web (TWEB) TWEB Homepage archive vol. 6 Issue 1, Mar. 2012 Article No. 3.

Wei Yang, Mukul R. Prasad, Tao Xie, A grey-box approach for automated GUI-model generation of mobile applications, Proceedings of the 16th international conference on Fundamental Approaches to Software Engineering, Mar. 16-24, 2013, Rome, Italy [doi>10.1007/978-3-642-37057-1_19].

Walkinshaw, N., Lambeau, B., Damas, C., Bogdanov, K., & Dupont, P. Stamina: a competition to encourage the development and assessment of software model inference techniques. In Empirical software engineering (pp. 1-34) 2012.

Mirzaei, N., Malek, S., Păsăreanu, C.S., Esfahani, N., Mahmood, R.: Testing Android apps through symbolic execution. SIGSOFT Softw. Eng. Notes 37, 1-5 (2012).

Giannakopoulou, Dimitra, Zvonimir Rakamarić, and Vishwanath Raman. "Symbolic learning of component interfaces." Static Analysis. Springer Berlin Heidelberg, 2012. 248-264.

Botinčan, Matko, and Domagoj Babić. "Sigma*: symbolic learning of input-output specifications." ACM SIGPLAN Notices 48.1 (2013): 443-456.

* cited by examiner

VERIFICATION OF A MODEL OF A GUI-BASED APPLICATION

FIELD

The embodiments discussed herein are related to verifying a model of a graphical user interface (GUI) based application.

BACKGROUND

Graphical user interface (GUI) based applications for electronic devices, such as mobile applications for mobile devices, are becoming increasingly common. Many GUI-based applications execute operations based on actions performed on a GUI via a touchscreen, which may ease use of the GUI-based applications. However, the GUI and touchscreen interface of the GUI-based applications also provide challenges in assessing the behavior of the GUI-based applications and modeling the GUI-based applications.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving a model of a graphical user interface (GUI) based application that includes a plurality of paths. The method may further include determining one or more paths of the plurality of paths that each include a pattern that satisfies a rule-pattern. The rule-pattern may be based on potential inaccuracies in the model as indicated by the pattern. The method may additionally include verifying whether the model is consistent with the GUI-based application. The verification may be based on a prioritization of a determination of whether the one or more paths are consistent with the GUI-based application. The prioritization of the one or more paths may be based on the one or more paths each including the pattern The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The behavior of a graphical user interface (GUI) based application (referred to hereinafter as the "GUI-based application") may be learned and then modeled as a finite-state model using any number of behavior learning techniques and algorithms. For example, a crawler may crawl the GUI-based application and may observe and record behavior of the GUI-based application during the crawl. The recorded behavior may be passed to a learning engine that may derive a finite-state conjecture model (referred hereinafter as "the conjecture model") of the GUI based application based on the recorded behavior. In some instances, the conjecture model may be inaccurate with respect to the actual behavior of the GUI-based application.

For example, the crawler may observe and record the behavior of the GUI-based application by performing actions on the GUI of the GUI-based application such that the crawler may observe behavior of the GUI-based application that is directly observable from the GUI of the GUI-based application (referred to hereinafter as "directly observable behavior"). However, the GUI-based application may include behavior that is not directly observable on the GUI-based application (referred to hereinafter as "hidden behavior"). Therefore, the crawler may not accurately observe the true behavior of the GUI-based application such that the conjecture model may be inaccurate as compared to the actual behavior of the GUI-based application.

The hidden behavior of the GUI-based application may manifest as certain patterns in the directly observable behavior of the GUI-based application. Therefore, paths of the conjecture model that follow the certain patterns may indicate that hidden behavior of the GUI-based application may be occurring with the directly observable behavior that may be represented by the paths that follow the certain patterns. Consequently, the paths that follow the certain patterns may have a higher likelihood of being inconsistent with the true behavior of the GUI-based application.

As described in detail below, according to some embodiments of the present disclosure, the conjecture model may be verified by determining which paths of the conjecture model include a pattern that satisfies a rule-pattern. The rule-pattern may be based on potential inaccuracies of the conjecture model that may be indicated by the pattern. For example, the rule-pattern may be based on a pattern that is commonly associated with hidden behavior of the GUI-based application.

The paths that satisfy the rule-pattern may be prioritized over paths that do not satisfy the rule-pattern for determining whether the paths are consistent with the GUI-based application. The prioritization of paths may increase the likelihood of determining early on that the conjecture model is inaccurate and inconsistent with respect to the GUI-based application. Therefore, the efficiency of verifying the conjecture model may be improved as compared to other verifying methods that do not perform any rule-based verification. In the present disclosure, reference as to whether a model or paths of the model are consistent, equivalent, or accurate with respect a GUI-based application may refer to whether the model or paths accurately represent the actual behavior of the GUI-based application.

Embodiments of the present disclosure are explained with reference to the accompanying drawings.

Figure 1A:
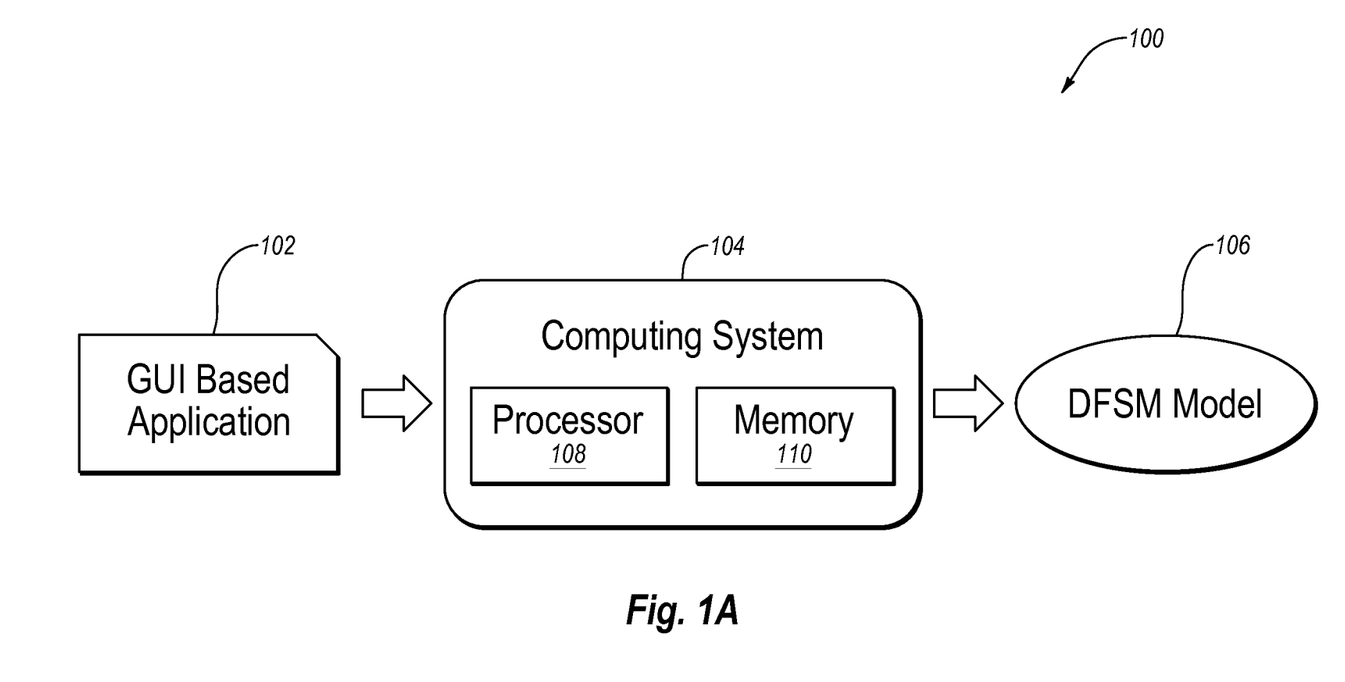
FIG. 1A illustrates an example system of generating and verifying a model of a GUI-based application.

FIG. 1A illustrates an example system 100 of generating and verifying a deterministic finite state-machine (DFSM) model 106 of a GUI-based application 102, arranged in accordance with at least one embodiment of the present disclosure. The GUI-based application 102 may be any suitable GUI-based application that may be included on an electronic device. The electronic device may include, but is not limited to, a tablet computer, a smartphone, a navigation system, an entertainment system, a desktop computer, a laptop computer, a digital music player, etc.

The GUI-based application 102 may include one or more states. The GUI-based application 102 may transition between states based on actions that may be performed on the GUI of the GUI-based application 102. The states may be associated with a screen of the GUI-based application and more than one state may be associated with the same screen. When more than one state is associated with the same screen, differences between the states may be based on hidden behavior of the GUI-based application 102 that may not be directly observable from the GUI of the GUI-based application 102. Therefore, in some instances, different states of the GUI-based application 102 may be directly observed on the GUI of the GUI-based application as being the same state. As indicated above and described below, the hidden behavior may create inconsistencies in models that may be generated for the GUI-based application 102.

In some embodiments, the system 100 may include a computing system 104. The computing system 104 may include a processor 108 and memory 110. The processor 108 may be any suitable special-purpose or general-purpose computer, computing entity, or processing device including various computer hardware or software modules and may be configured to execute instructions stored on any applicable computer-readable media. For example, the processor 108 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1A, it is understood that the processor 108 may include any number of processors configured to perform any number of operations together and/or individually.

The memory 110 may include computer-readable media for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media. Computer-executable instructions may include, for example, instructions and data which cause the processor 108 to perform a certain function or group of functions.

The computing system 104 may be configured to receive the GUI-based application 102 and may be configured to generate the DFSM model 106 of the GUI-based application 102. The DFSM model 106 may represent the behavior of the GUI-based application 102 and the transitions between states of the GUI-based application. In some embodiments, the computing system 104 may be configured to generate the DFSM model 106 according to a method 300 of FIG. 3 described below.

Figure 2A:
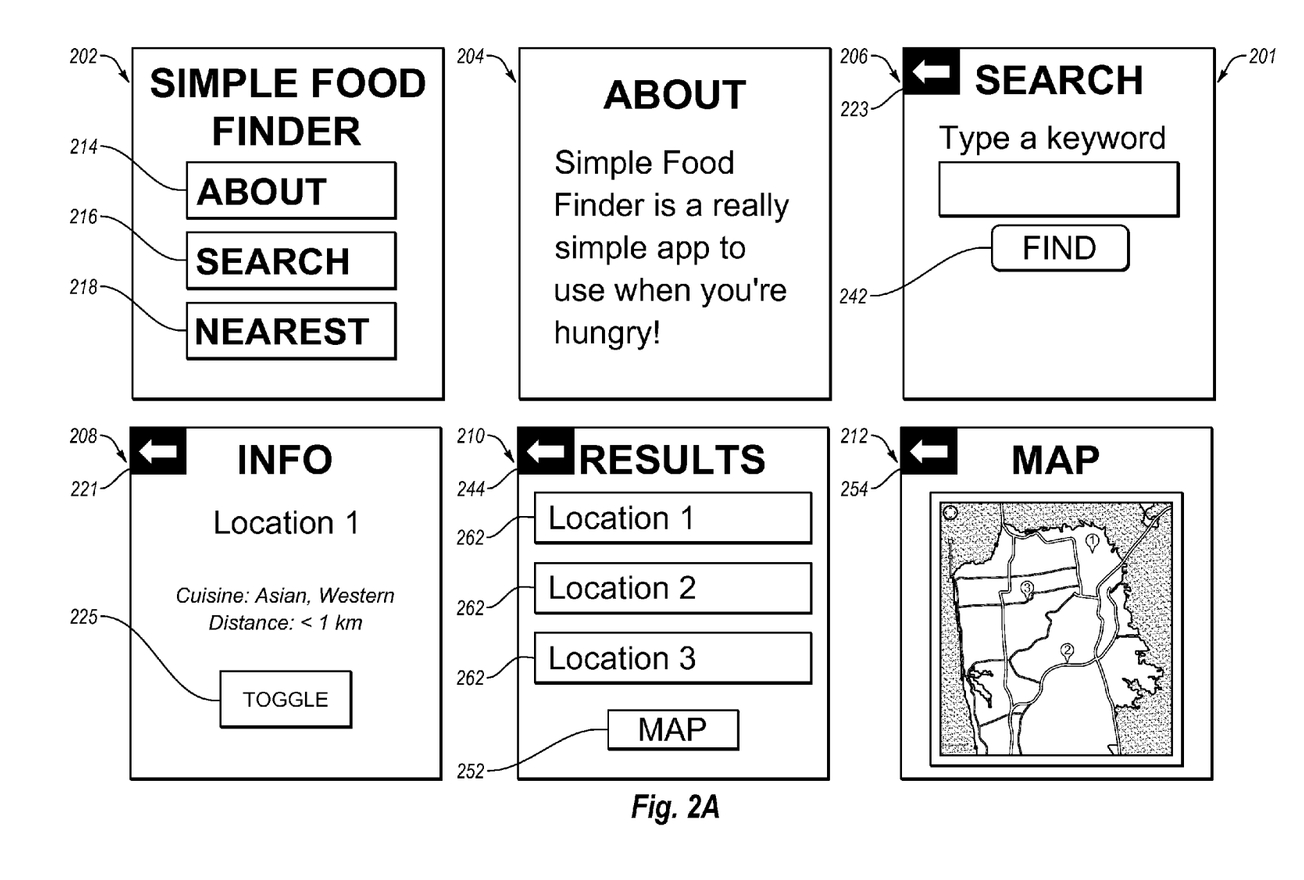
FIG. 2A illustrates various screens of a sample GUI-based application.
Figure 2B:
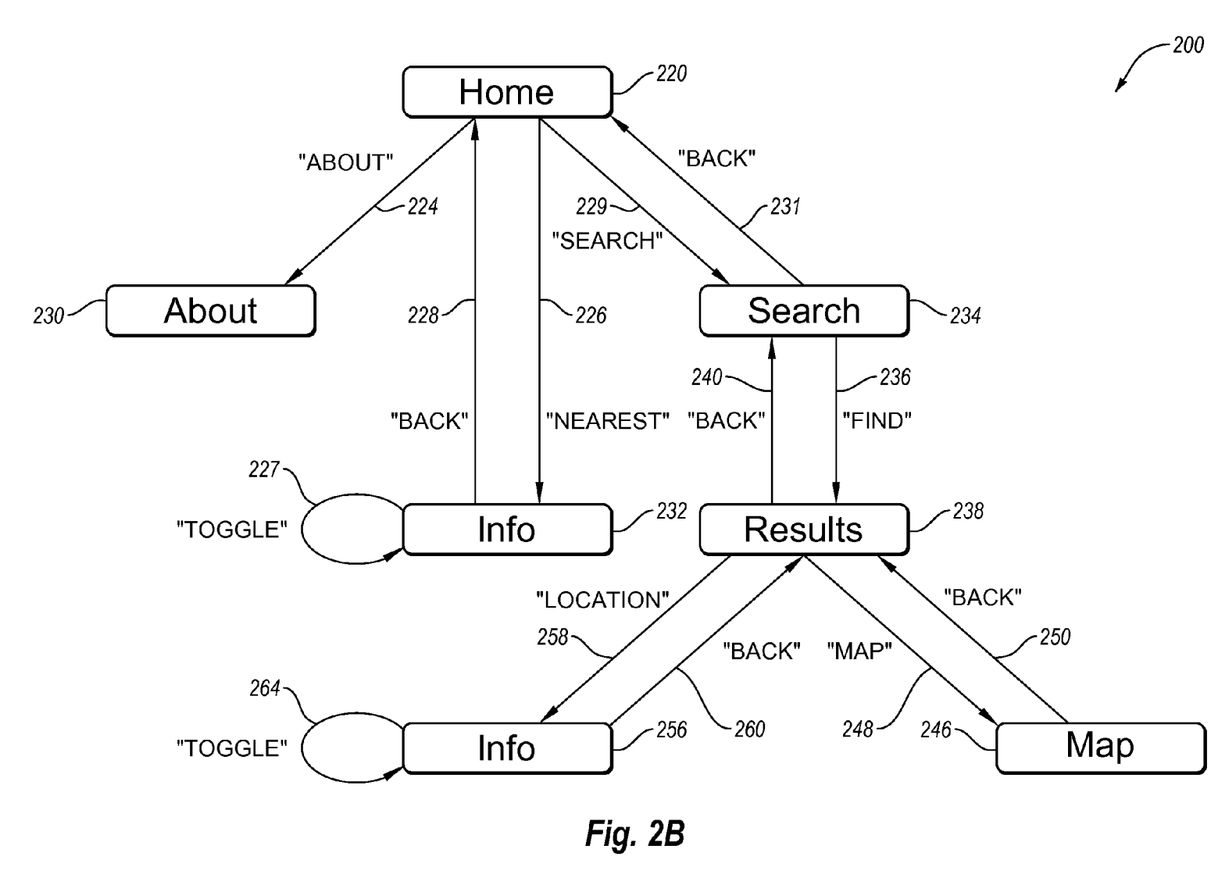
FIG. 2B illustrates an example DFSM model that may represent the behavior of the sample GUI-based application of FIG. 2A.

FIG. 2A illustrates various screens of a sample GUI-based application 201 (referred to hereinafter as the "sample application 201") that may each be associated with one or more states of the sample application 201, according to at least one embodiment described herein. FIG. 2B illustrates an example DFSM model 200 (referred to hereinafter as "the model 200") that may represent the behavior of the sample application 201, according to at least one embodiment described herein. In some embodiments, the sample application 201 may be an example of the GUI-based application 102 of FIG. 1A and the model 200 may be an example of the DFSM model 106 that may be generated by the computing system 104 from the sample application 201.

The sample application 201 may be a GUI-based application that helps a user find and locate places nearby from which to obtain food. By way of example, and as illustrated in FIG. 2A, the sample application 201 may include a "Home" screen 202, an "About" screen 204, a "Search" screen 206, an "Information" screen 208, a "Results" screen 210, and a "Map" screen 212. The "Home" screen 202 may include various widgets that may allow the user to perform various operations with respect to the sample application 201. The "About" screen 204 may provide information about the sample application 201. The "Search" screen 206 may allow for the user to search for a place from which to obtain food. The "Information" screen 208 may provide information about a location that may provide food. The "Results" screen 210 may provide the results of a search that may be performed on the "Search" screen 206. The "Map" screen 212 may show the locations included in the "Results" screen 210 on a map. The relationships between the different actions that may be performed on the different screens and the associated transitions between states and/or screens are described in detail below with respect to the model 200.

For example, the model 200 may include a state 220 that may be associated with the "Home" screen 202, as indicated by the label "Home" in the state 220. The model 200 may include a transition edge 224 from the state 220 to a state 230. The state 230 may be associated with the "About" screen 204 as indicated by the label "About" in the state 230. The transition edge 224 may indicate a transition from the state 220 and the "Home" screen 202 to the state 230 and the "About" screen 204 in response to a user tapping an "ABOUT" widget 214 on the "Home" screen 202.

The model 200 may include a transition edge 226 from the state 220 to a state 232. The state 232 may be associated with the "Information" screen 208 as indicated by the label "Info" in the state 232. The transition edge 226 may indicate a transition from the state 220 and the "Home" screen 202 to the state 232 and the "Information" screen 208 in response to a user tapping a "NEAREST" widget 218 on the "Home" screen 202. The model 200 may also include a transition edge 228 from the state 232 back to the state 220. The transition edge 228 may indicate a transition from the state 232 and the "Information" screen 208 to the state 220 and the "Home" screen 202 in response to a user tapping a "BACK" widget 221 on the "Information" screen 208 when the sample application 201 is in the state 232. A self-transition edge 227 of the model 200 indicates that the sample application 201 may stay in the state 232 in response to the user tapping a "TOGGLE" widget 225 on the "Information" screen 208.

Additionally, the model 200 may include a transition edge 229 from the state 220 to a state 234. The state 234 may be associated with the "Search" screen 206, as indicated by the label "Search" in the state 234. The transition edge 229 may indicate a transition from the state 220 and the "Home" screen 202 to the state 234 and the "Search" screen 206 in response to a user tapping a "SEARCH" widget 216 on the "Home" screen 202. The model 200 may also include a transition edge 231 from the state 234 back to the state 220. The transition edge 231 may indicate a transition from the state 234 and the "Search" screen 206 to the state 220 and the "Home" screen 202 in response to a user tapping a "BACK" widget 223 on the "Search" screen 206 when the sample application 201 is in the state 234.

The model 200 may also include a transition edge 236 from the state 234 to a state 238. The state 238 may be associated with the "Results" screen 210 as indicated by the label "Results" in the state 238. The transition edge 236 may indicate a transition from the state 234 and the "Search" screen 206 to the state 238 and the "Results" screen 210 in response to a user tapping a "FIND" widget 242 on the "Search" screen 206. The model 200 may also include a transition edge 240 from the state 238 back to the state 234. The transition edge 240 may indicate a transition from the state 238 and the "Results" screen 210 back to the state 234 and the "Search" screen 206 in response to a user tapping a "BACK" widget 244 on the "Results" screen 210 when the sample application 201 is in the state 238.

The model 200 may also include a transition edge 248 from the state 238 to a state 246. The state 246 may be associated with the "Map" screen 212 as indicated by the label "Map" in the state 246. The transition edge 248 may indicate a transition from the state 238 and the "Results" screen 210 to the state 246 and the "Map" screen 212 in response to a user tapping a "MAP" widget 252 on the "Results" screen 210. The model 200 may also include a transition edge 250 from the state 246 back to the state 238. The transition edge 250 may indicate a transition from the state 246 and the "Map" screen 212 back to the state 238 and the "Results" screen 210 in response to a user tapping a "BACK" widget 254 on the "Map" screen 212 when the sample application 201 is in the state 246.

The model 200 may also include a transition edge 258 from the state 238 to a state 256. The state 256 may be associated with the "Information" screen 208 as indicated by the label "Info" in the state 256. The transition edge 258 may indicate a transition from the state 238 and the "Results" screen 210 to the state 256 and the "Information" screen 208 in response to a user tapping a "LOCATION" widget 262 on the "Results" screen 210. The model 200 may also include a transition edge 260 from the state 256 to the state 238. The transition edge 260 may indicate a transition from the state 256 and the "Information" screen 208 to the state 238 and the "Results" screen 210 in response to a user tapping the "BACK" widget 221 on the "Information" screen 208 when the sample application 201 is in the state 256. A self-transition edge 264 of the model 200 indicates that the sample application 201 may stay in the state 256 in response to the user tapping the "TOGGLE" widget 225 on the "Information" screen 208.

The sample application 201 and the model 200 depicted in FIGS. 2A and 2B are merely examples and are not meant to be limiting. Any number of DFSM models may be generated for any number of GUI-based applications in concordance with the present disclosure.

Returning to FIG. 1A, in some embodiments, during the generation of the DFSM model 106, the computing system 104 may generate a conjecture DFSM model ("conjecture model"). The computing system 104 may be configured to verify the conjecture model to determine whether the conjecture model is substantially consistent with the GUI-based application 102. When the conjecture model is deemed to be substantially consistent with the GUI-based application 102, the conjecture model may be output as the DFSM model 106. In some embodiments, the computing system 104 may be configured to verify the conjecture model according to a method 400 of FIGS. 4A and 4B, described below.

In some embodiments, the computing system 104 may be configured to verify the conjecture model by determining whether one or more paths of the conjecture model are consistent with the GUI-based application 102. Determining whether a path is consistent with the GUI-based application 102 may also be referred to as verifying the path. In these or other embodiments, paths of the conjecture model may be ordered according to a prioritization scheme. The prioritization scheme may dictate which paths are verified first.

In some embodiments, the prioritization of the paths may be based on which paths include patterns that satisfy one or more rule-patterns. The rule-patterns may be based on potential inaccuracies in the conjecture models that may be indicated by the patterns. As indicated above, inaccuracies in the conjecture model may be due to hidden behavior in the GUI-based application 102. Therefore, in some embodiments, the rule-patterns may be based on potential patterns in topologies of the conjecture model that may indicate hidden behavior of the GUI-based application 102. In these or other embodiments, one or more of the rule-patterns may indicate instances when multiple states of the GUI-based application 102 are represented by a single state in the conjecture model.

Figure 1B:
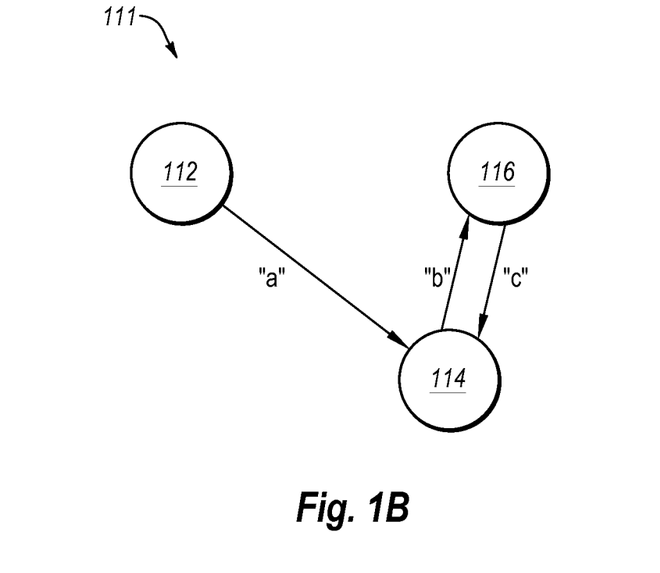
FIG. 1B illustrates an example rule-pattern.

FIG. 1B illustrates an example rule-pattern 111, according to at least one embodiment described herein. The rule-pattern 111 may include a pattern that may potentially manifest in the topology of the conjecture model and that may, but does not necessarily, indicate hidden behavior of the GUI-based application 102. Therefore, in some instances, the rule-pattern 111 may indicate an inconsistency between the conjecture model and the GUI-based application 102. The rule-pattern 111 may include a first state 112, a second state 114, and a third state 116. The rule-pattern 111 may follow a sequence of actions "'a'→'b'→'c'" in which a transition may occur from the first state 112 to the second state 114 in response to the action "a," a transition may occur from the second state 114 to the third state 116 in response to the action "b," and a transition may occur from the third state 116 back to the second state 114 in response to the action "c."

In some instances, the rule-pattern 111 may indicate hidden behavior of the GUI-based application 102 that may be associated with a "back" operation of the GUI-based application 102. For example, the GUI-based application 102 may transition to a particular screen of the GUI-based application 102 from two or more different screens of the GUI-based application 102 such that two or more different states may be associated with the particular screen. Therefore, when a "back" operation is performed on the particular screen with respect to a particular state, the GUI-based application 102 may transition to different screens and states depending on from which screen and state the transition to the particular screen and the particular state occurred. The determination as to which screen and state to transition to from the particular screen and state in response to the "back" operation may include behavior that is hidden from the GUI of the GUI-based application 102.

Because of the hidden behavior associated with the "back" operation, the conjecture model may represent multiple states of the GUI-based application 102 as a single state such that the conjecture model may inaccurately represent the behavior associated with the "back" operation. For example, the conjecture model may include the rule-pattern 111 where the action "b" in the sequence of actions "'a'→'b'→'c'" may be associated with a "back" operation such that the second state 114 may represent more than one state in the GUI-based application 102. Therefore, the conjecture model may inaccurately represent that the GUI-based application 102 may transition from the second state 114 to the third state 116 in response to the "back" operation instead of transitioning back to the first state 112 in response to the "back" operation.

Figure 1C:
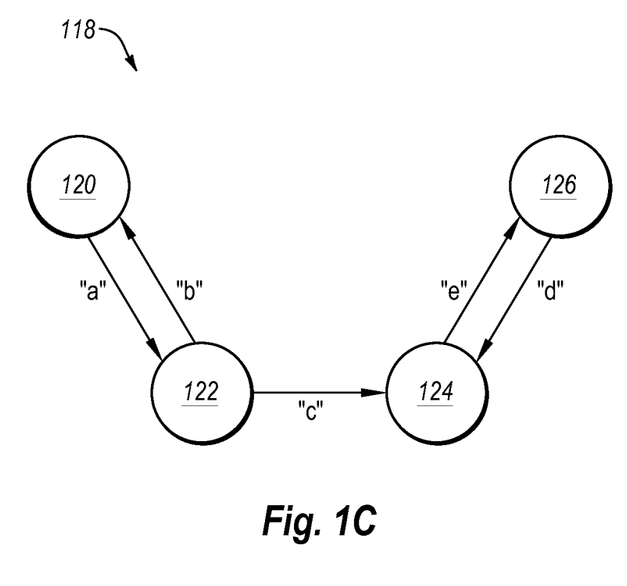
FIG. 1C illustrates another example rule-pattern.

FIG. 1C illustrates an example rule-pattern 118, according to at least one embodiment described herein. Like the rule-pattern 111 of FIG. 1B, the rule-pattern 118 may include a pattern that may potentially manifest in the topology of the conjecture model and that may, but does not necessarily, indicate hidden behavior of the GUI-based application 102. Therefore, the rule-pattern 118 may also indicate an inconsistency between the conjecture model and the GUI-based application 102.

The rule-pattern 118 may include a first state 120, a second state 122, a third state 124, and a fourth state 126. The second state 122 and the third state 124 may include the same potential actions, e.g., the second state 122 and the third state 124 may be associated with the same screen of the GUI-based application 102. The rule-pattern 118 may follow a sequence of actions "'a'→'c'→'c'" in which a transition may occur from the first state 120 to the second state 122 in response to the action "a," a transition may occur from the second state 122 to the third state 124 in response to the action "c," and a transition may occur from the third state 124 to the fourth state 126 in response to the action "e."

The rule-pattern 118 may represent a potential inconsistency where a screen of the corresponding GUI-based application may be represented by the states 122 and 124, and where the screen supports the action "c" which may cause the GUI-based application to remain in the same screen and the same state in a self-loop. However, in some instances, this behavior may be incorrectly represented in a conjecture model as a transition from one state associated with the screen (e.g., the state 122) to another state associated with the screen (e.g., the state 124) such as illustrated in the rule-pattern 118. In contrast, in a consistent and correct model of this behavior, each of the two states associated with the same screen may have a self-loop associated with the action "c".

Returning to FIG. 1A, in some embodiments, the computing system 104 may be configured to sort the rule-patterns based on specificity. The specificity may relate to how likely a path that follows the rule-pattern is inconsistent with the GUI-based application 102. For example, a higher percentage of paths that follow the rule-pattern 111 of FIG. 1B are likely to be consistent with the GUI-based application 102 than a percentage of paths that follow the rule-pattern 118 of FIG. 1C. Therefore, the rule-pattern 118 may be considered as being more specific than the rule-pattern 111.

The computing system 104 may be configured to verify the paths of the conjecture model based on the ordered specificity of the rule-patterns. For example, the computing system 104 may be configured to determine which paths of the conjecture model satisfy the rule-pattern 118 and to verify those paths before determining which paths satisfy the rule-pattern 111 and verifying those corresponding paths. Therefore, the likelihood of determining an inconsistency early on may be increased.

In these or other embodiments, the computing system 104 may be configured to determine one or more priority weights for one or more paths of the conjecture model. In some embodiments, the priority weights may be based on one or more heuristics that may be applied to the paths. The heuristics may be based on properties of the paths that may also indicate that a potential inconsistency may occur.

For example, a large number of incoming edges associated with a state in the conjecture model may indicate that the state is representing multiple states of the GUI-based application 102. Therefore, in some embodiments, the heuristics may include a number of incoming edges associated with one or more states of the paths. The paths with the higher number of incoming edges associated with one or more corresponding states may be given a higher priority weight.

The computing system 104 may be configured to verify the paths of the conjecture model based on the priority weights also. For example, the computing system 104 may be configured to verify paths having a higher priority weight before verifying paths having a lower priority weight. In some embodiments the paths that satisfy a particular rule-pattern may be verified in an order that is based on their respective priority weights.

Accordingly, the system 100 may be configured to generate and verify a DFSM model of a GUI-based application. Modifications, additions, or omissions may be made to the system 100 without departing from the scope of the present disclosure. For example, the rule-patterns 111 and 118 are merely examples of rule-patterns that may be used to verify a conjecture model. Other rule-patterns may also be used to verify the conjecture model. Further, the number of incoming edges is merely an example heuristic that may be used for determining a priority weight for the paths. For example the length of a path may be used as a criterion for prioritization. Short paths may not cover substantial enough behavior to expose inconsistencies, while really long paths may be too many in number and may be relatively expensive to verify. Thus, a non-monotonic prioritization scheme which favors medium-length paths may be used.

Another heuristic could be to prioritize paths based on the length of the longest sub-sequence of that path that has been previously explored. The smaller this sub-sequence, the more likely this path may explore substantially new behavior and may thus be more likely to expose an inconsistency. Yet another heuristic may be to prioritize paths containing one or more instances of actions from a pre-defined set of actions that are often implicated in inconsistent behavior. The "BACK" action is an example of such an action.

Figure 3:
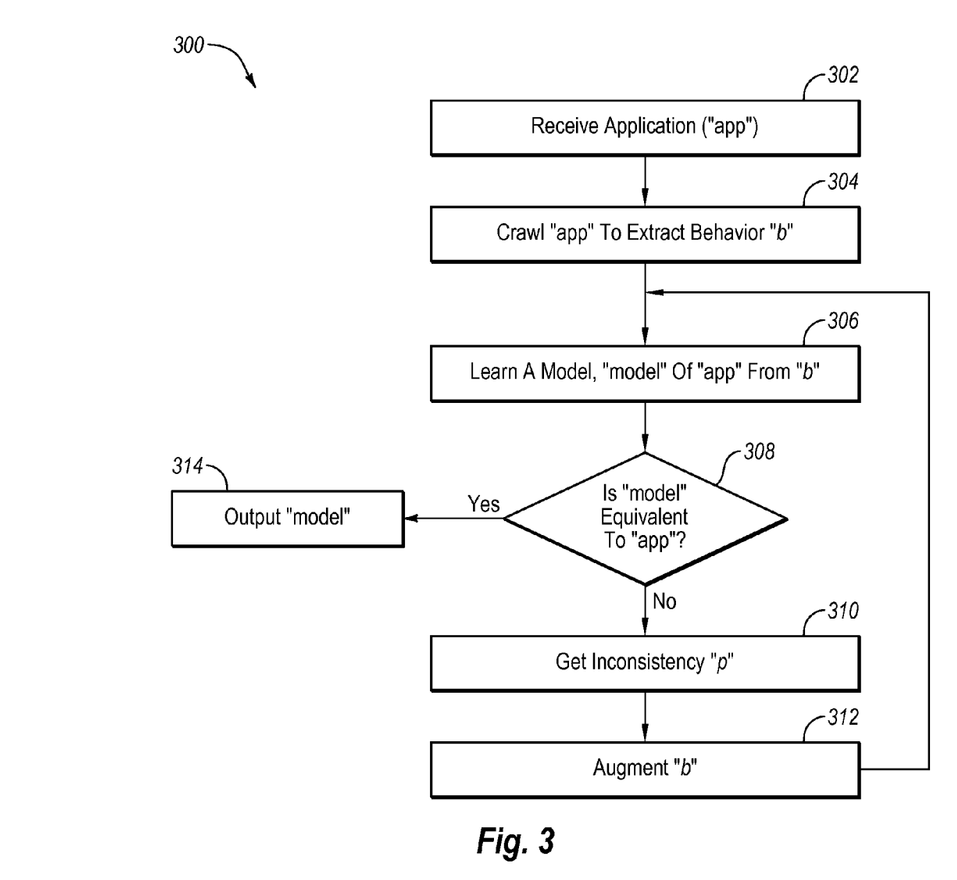
FIG. 3 is a flowchart of an example method of generating a DFSM model of a GUI-based application.

FIG. 3 is a flowchart of an example method 300 of generating a DFSM model of a GUI-based application, according to at least one embodiment of the present disclosure. The method 300 may be implemented in some embodiments by a computing system, such as the computing system 104 of FIG. 1A. For instance, the processor 108 of the computing system 104 may be configured to execute computer instructions stored in the memory 110 to perform actions for generating the DFSM model 106 of the GUI-based application 102, as represented by one or more of blocks of the method 300. Although illustrated as discrete blocks, various blocks may be divided into additional blocks, combined into fewer blocks, or eliminated, depending on the desired implementation.

The method 300 may begin, and at block 302, where a GUI-based application "app" may be received. For example, the GUI-based application 102 of FIG. 1A may be received at block 302. At block 304, "app" may be crawled to observe and extract behavior "b" of "app." The crawling may be performed by any suitable crawler (e.g., a dynamic crawler) that may automatically interact with "app" through the GUI of "app" such that the crawler may record and observe the behavior "b" of "app," as indicated by changes in the GUI of "app."

At block 306, a conjecture model "model" of "app" may be learned from the behavior "b." The learning may be performed by any suitable learning engine, which may be a passive learning engine or an active learning engine. A passive learning engine may generate "model" based on the behavior "b" that may be observed by the crawler without any input from the passive leaning engine. In contrast, an active learning engine may direct the crawler to crawl one or more portions of "app" in generating the behavior "b" such that the active learning engine may provide input corresponding to the extraction of the behavior "b."

At block 308, it may be determined whether "model" is substantially equivalent to "app." As indicated above, a determination as to whether "model" is substantially equivalent to "app" may be a determination as to whether "model" accurately represents the behavior of "app." In some embodiments, the determination performed at block 308 may be performed according to a method 400 described below with respect to FIGS. 4A and 4B. When "model" is not substantially equivalent to "app," an inconsistency "p" between "model" and "app" may be observed and the method 300 may proceed from block 308 to block 310. In some embodiments, the inconsistency "p" may be identified according to one or more operations associated with the method 400 also. When "model" is substantially equivalent to "app," the method 300 may proceed from block 308 to block 314.

At block 310, the inconsistency "p" may be retrieved. At block 312, the behavior "b" may be augmented with respect to the inconsistency "p." For example, in some embodiments, the inconsistency "p" may be a path of "app" that is inconsistent with a path in "model." In these and other embodiments, the inconsistency "p" may then be used as a counter-example that may be fed to the crawler. The crawler may then crawl "app" based on the inconsistency "p" such that additional behavior of "app" may be observed and extracted. The additional behavior may be added to the behavior "b" such that the behavior "b" may in effect be augmented with respect to the inconsistency "p." Following block 312, the method 300 may return to block 306, where a new conjecture model "model" may be learned based on the augmented behavior "b."

At block 314, when "model" is substantially equivalent to "app," "model" may be output as a verified DFSM model of "app." For example, with respect to FIG. 1A, the DFSM model 106 may be output at block 314 as a verified model of the GUI-based application 102.

Therefore, the method 300 may be used to generate a DFSM model of a GUI-based application. Modifications, additions, or omissions may be made to the method 300 without departing from the scope of the present disclosure. For example, one skilled in the art will appreciate that for the method 300, the functions performed may be implemented in differing order. Furthermore, the outlined steps and actions are only provided as examples, and some of the steps and actions may be optional, combined into fewer steps and actions, or expanded into additional steps and actions without detracting from the essence of the disclosed embodiments. For example, the operations performed at block 308 may include any number of additional operations, such as those described below with respect to FIGS. 4A and 4B.

Figure 4A:
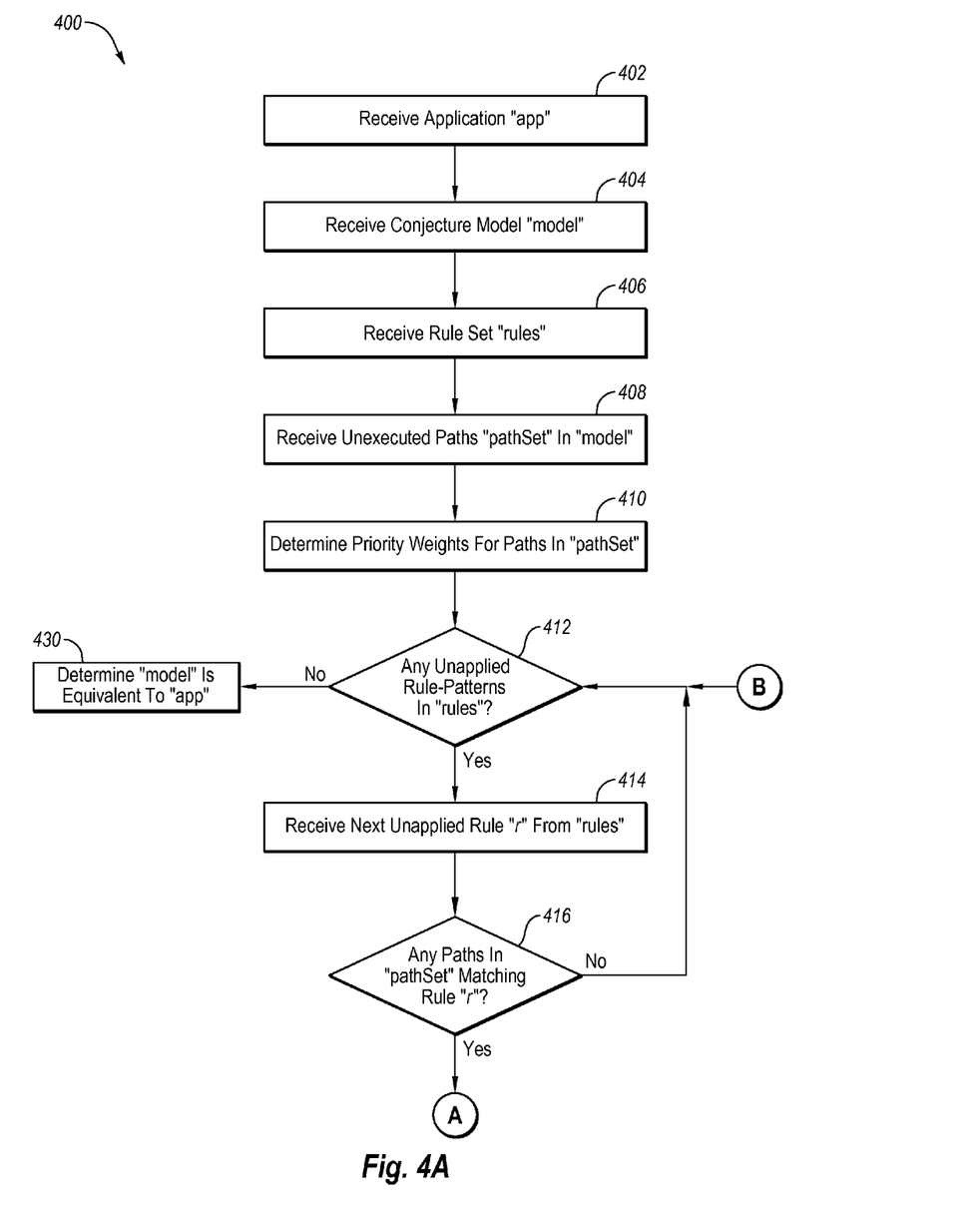
FIG. 4A is a flowchart of an example method of verifying a DFSM model of a GUI-based application.
Figure 4B:
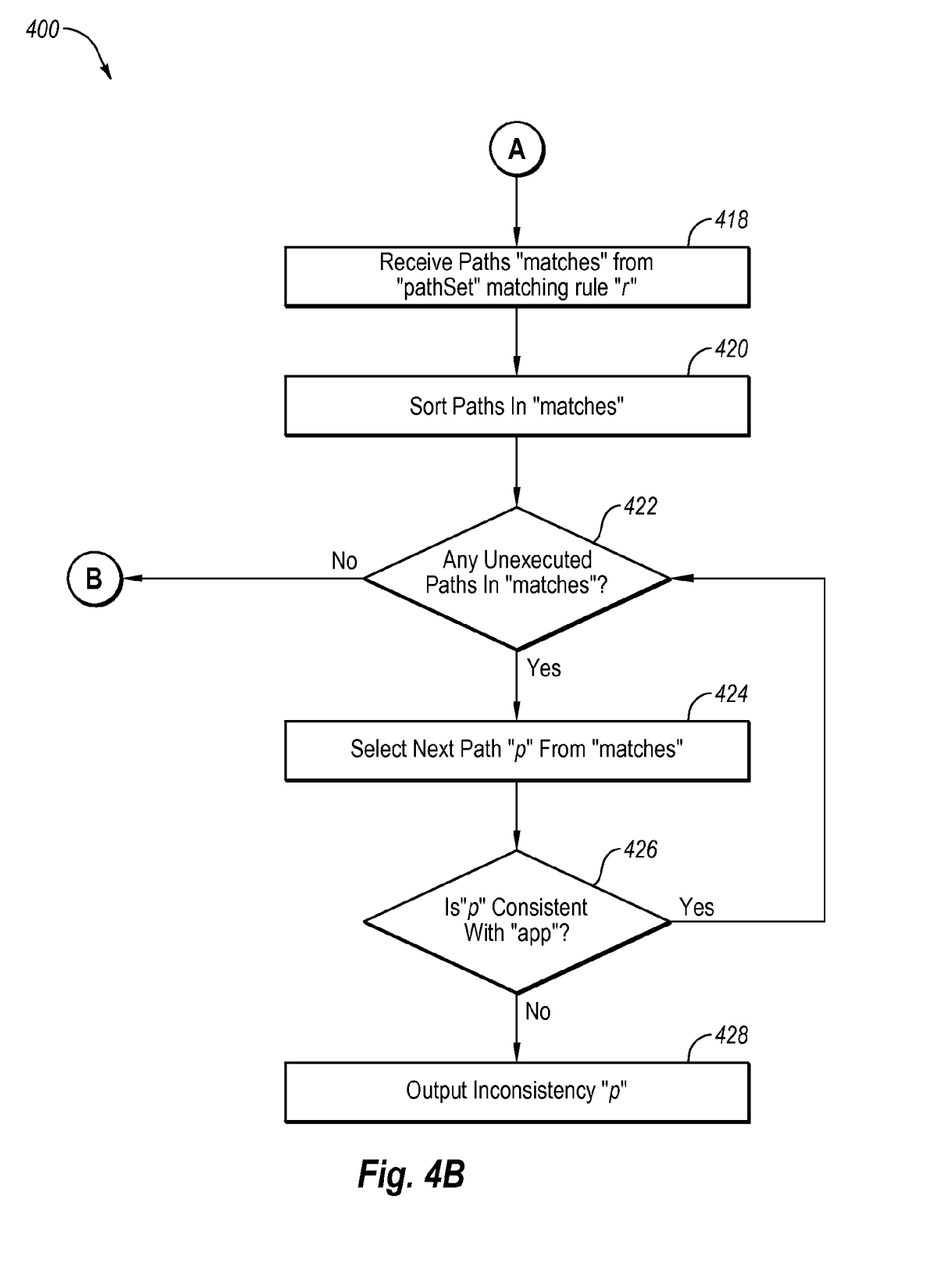
FIG. 4B is an extension of the flowchart of FIG. 4A.

FIGS. 4A and 4B illustrate a flowchart of an example method 400 of verifying a DFSM model of a GUI-based application, arranged in accordance with at least one embodiment of the present disclosure. As mentioned above, the method 400 may be used to perform one or more actions associated with blocks 308 and 310 of the method 300 described above. The method 400 may be implemented in some embodiments by a computing system, such as the computing system 104 of FIG. 1. For instance, the processor 108 of the computing system 104 may be configured to execute computer instructions stored in the memory 110 to perform actions verifying a DFSM model of the GUI-based application 102, as represented by one or more of blocks of the method 400. Although illustrated as discrete blocks, various blocks may be divided into additional blocks, combined into fewer blocks, or eliminated, depending on the desired implementation.

The method 400 may begin, and at block 402 a GUI-based application "app" may be received. For example, the GUI-based application 102 of FIG. 1 may be retrieved. As indicated above, in some embodiments the GUI-based application "app" of FIGS. 4A and 4B may include the same GUI-based application "app" of FIG. 3.

At block 404, a conjecture model "model" may be received. As indicated above, the conjecture model "model" may include the conjecture model "model" that may be learned at block 306 of FIG. 3.

At block 406, a set of rule-patterns "rules" may be received. The set of rule-patterns "rules" may include one or more patterns that may indicate potential inaccuracies in the conjecture model "model." For example, the set of set of rule-patterns "rules" may include the rule-patterns 111 and 118 described above with respect to FIGS. 1B and 1C, respectively. Additionally, in some embodiments, the set of rule-patterns "rules" may be sorted according to specificity.

At block 408, a set of unexecuted paths "pathSet" of the conjecture model "model" may be received. In the present disclosure, a path may be considered "unexecuted" in the context of the method 400 when that path has not yet been verified. For example, paths previously executed on "app" and directly used to learn the conjecture model "model" may be considered as verified. At block 410, priority weights may be determined for the paths in "pathSet." In some embodiments, the priority weights may be determined based on one or more heuristics, as described above. For example, the priority weights may be determined based on the number of incoming edges to one or more states of the paths in "pathSet."

At block 412, it may be determined whether there are any unapplied rule-patterns in the set of rule-patterns "rules." In the present disclosure, a particular rule-pattern may be considered "unapplied" in the context of the method 400 when it has not yet been determined whether one or more paths of the conjecture model "model" include the particular rule-pattern. When the set of rule-patterns "rules" includes one or more unapplied rule-patterns, the method 400 may proceed to block 414.

At block 414, a next unapplied rule-pattern "r" may be retrieved from the set of rule-patterns "rules." At block 416, it may be determined whether any paths in "pathSet" match the rule-pattern "r." In the present disclosure a path may be considered as "matching" or "satisfying" a rule-pattern when the path includes the pattern that matches the rule-pattern. When one or more paths in "pathSet" match the rule-pattern "r," the method 400 may proceed to block 418. When no paths in "pathSet" match the rule-pattern "r," the method 400 may return to block 412.

At block 418, the paths from "pathSet" that match the rule-pattern "r" ("matches") may be received. At block 420, the paths included in "matches" may be sorted according to their priority weights. At block 422, it may be determined whether "matches" includes any unexecuted paths. When "matches" includes one or more unexecuted paths, the method 400 may proceed to block 424. When "matches" does not include one or more unexecuted paths, the method 400 may return to block 412.

At block 424, a next unexecuted path "p" from "matches" may be selected. At block 426, it may be determined whether path "p" is consistent with "app." When path "p" is not consistent with "app," the method 400 may proceed to block 428. At block 428, the path "p" may be output as an inconsistency with respect to "app." In some embodiments, the path "p" may then function as the inconsistency "p" of blocks 310 and 312 of the method 300 described above.

When path "p" is consistent with "app" at block 426, method 400 may return to block 422. One or more of blocks 412, 414, 416, 418, 420, 422, 424, and 426 may be repeated until an inconsistency is found at block 426 or until it is determined at block 412 that there are no more unapplied rule-patterns in "rules." As indicated above, when the set of rule-patterns "rules" does not include one or more unapplied rule-patterns, the method 400 may proceed to block 430. When the method 400 reaches block 430 after applying the rule-patterns in "rules," the conjecture model "model" may be considered as being substantially equivalent to "app." As such, at block 430, it may be determined that the conjecture model "model" is substantially equivalent to "app." As indicated above with respect to block 314 of the method 300, in some embodiments, the conjecture model "model" may be output as a DFSM model for the GUI-based application "app" when it is determined at block 430 that the conjecture model "model" is substantially equivalent to "app."

Modifications, additions, or omissions may be made to the method 400 without departing from the scope of the present disclosure. For example, one skilled in the art will appreciate that for the method 400, the functions performed may be implemented in differing order. Furthermore, the outlined steps and actions are only provided as examples, and some of the steps and actions may be optional, combined into fewer steps and actions, or expanded into additional steps and actions without detracting from the essence of the disclosed embodiments. For example, in some embodiments, after a particular number of paths that satisfy a particular rule-pattern have been verified and no inconsistencies have been found via blocks 422, 424, and 426, the method 400 may move onto block 412 even if all the paths that satisfy the particular rule-pattern have not been verified.

Figure 5A:
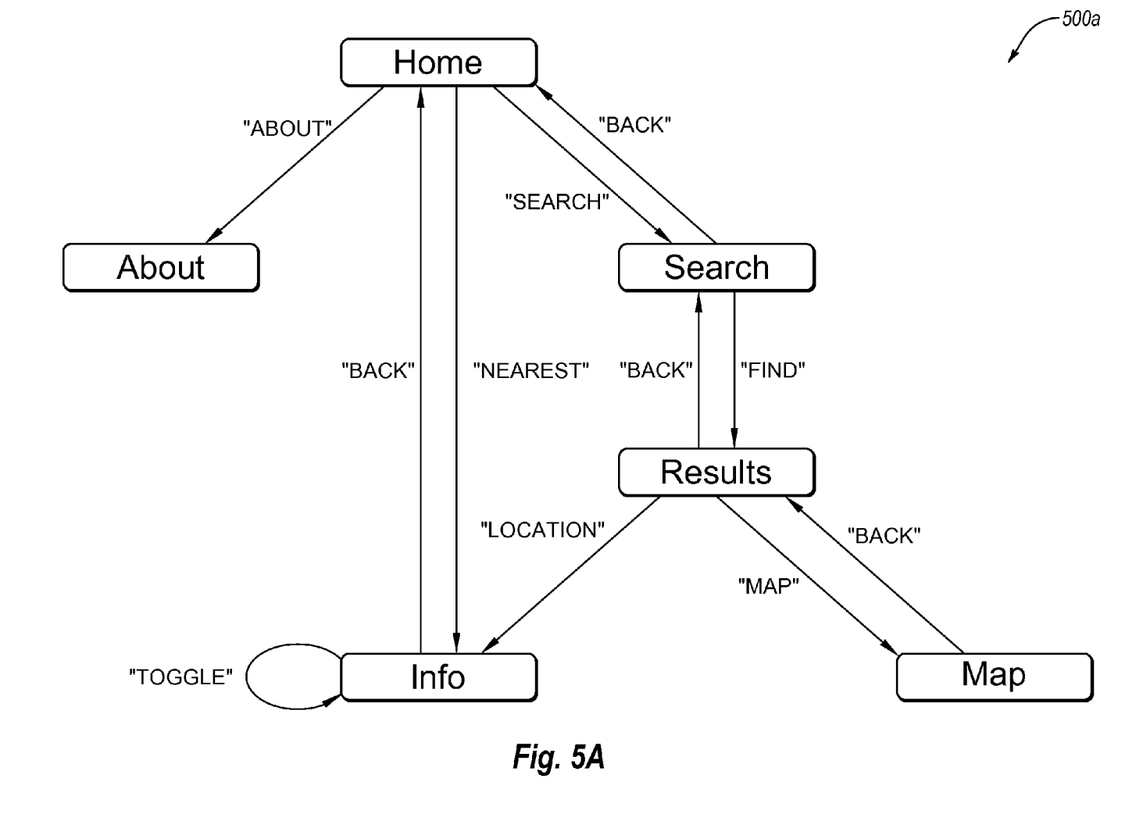
FIG. 5A illustrates an example conjecture model of the sample GUI-based application of FIG. 2A.

As indicated above, the methods 300 and 400 may be used to generate and verify DFSM models for a GUI-based application. For example, FIG. 5A illustrates an example conjecture model 500a of the sample application 201 of FIG. 2A. The conjecture model 500 may be generated using blocks 302, 304, and 306 of the method 300. Additionally, one or more blocks of the method 400 may be used to verify whether the conjecture model 500 is substantially equivalent to the sample application 201.

For example, in some embodiments, the computing system 104 of FIG. 1A may receive the sample application 201, the conjecture model 500a, and a set of rule-patterns per blocks 402, 404, and 406 of the method 400. The set of rule-patterns may include the rule-patterns 111 and 118 of FIGS. 1B and 1C respectively. Additionally, the set of rule-patterns may be ordered based on specificity in which the rule-pattern 118 may be prioritized over the rule-pattern 111 because the rule-pattern 118 may be more specific than the rule-pattern 111, as described above.

Additionally, per blocks 408 and 410 of the method 400, the computing system 104 may determine the unexecuted paths of the conjecture model 500a and may compute priority weights for the unexecuted paths of the conjecture model 500a. In the illustrated example, the priority weights may be determined based on the number of incoming edges with respect to the states of the unexecuted paths.

Per blocks 412, 414, and 416, the computing system 104 may first retrieve the rule-pattern 118 from the set of rule-patterns and may determine whether any paths in the conjecture model 500a match the rule-pattern 118. In the illustrated example, there may not be any paths in the conjecture model 500a that match the rule-pattern 118. Therefore, the computing system may then retrieve the rule-pattern 111 from the set of rule-patterns and may determine whether any paths of the conjecture model match the rule-pattern 111. In the illustrated embodiment, the conjecture model 500a may include 34 paths that match the rule-pattern 111. The computing system 104 may attempt to apply the rule-patterns 118 and 111 in the order indicated based on the prioritization of the rule-patterns 118 and 111.

Per blocks 418 and 420, the computing system 104 may retrieve the paths that match the rule-pattern 111 and may order them according to their priority weights. For example, Table 1 below includes the action sequences of the top 10 (according to highest priority weight) of the 34 paths that match the rule-pattern 111.

TABLE 1

1. "LOCATIONS" → "BACK" → "NEAREST" → "TOGGLE" → "TOGGLE"
2. "BACK" → "SEARCH" → "BACK" → "NEAREST" → "TOGGLE"
3. "BACK" → "NEAREST" → "BACK" → "NEAREST" → "TOGGLE"
4. "LOCATIONS" → "BACK" → "NEAREST" → "TOGGLE" → "BACK"
5. "LOCATIONS" → "BACK" → "NEAREST" → "BACK" → "NEAREST"
6. "BACK" → "SEARCH" → "BACK" → "NEAREST" → "BACK"
7. "BACK" → "NEAREST" → "BACK" → "NEAREST" → "BACK"
8. "LOCATIONS" → "BACK" → "NEAREST" → "BACK" → "SEARCH"
9. "SEARCH" → "FIND" → "BACK" → "BACK" → "NEAREST"
10. "BACK" → "SEARCH" → "BACK" → "SEARCH" → "FIND"

Per blocks 422 and 424, the computing system 104 may first select path "1" indicated in Table 1 to determine whether path "1" is consistent with the sample application 201 based on the ordering of the paths, which may be based on the priority weight. Per block 426, the computing system 104 may determine whether path "1" is inconsistent with the sample application 201. In the illustrated example, path "1" may be inconsistent with the sample application 201. Therefore, the computing system 104 may output path "1" as an inconsistency with respect to the sample application 201.

Figure 5B:
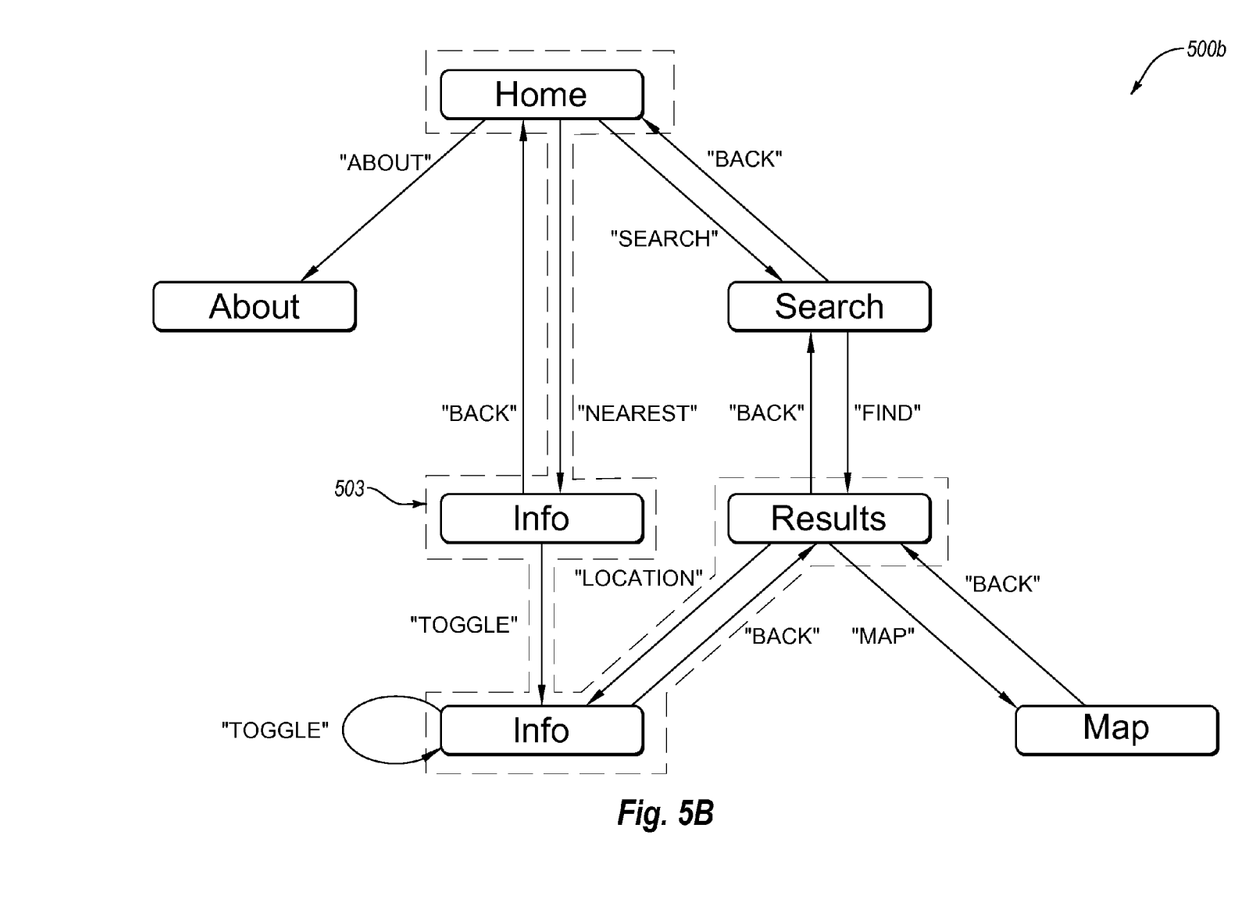
FIG. 5B illustrates another example conjecture model of the sample GUI-based application of FIG. 2A

Based on the inconsistency associated with path "1," in some embodiments, the computing system 104 may return to method 300 and may generate a new conjecture model per blocks 310, 312, and 306. FIG. 5B illustrates an example conjecture model 500b of the sample application 201 of FIG. 2B that may be generated based on the inconsistency associated with path "1."

The computing system 104 may then return to the method 400 and may receive the sample application 201, the conjecture model 500b, and the set of rule-patterns per blocks 402, 404, and 406 of the method 400. As with application of the method 400 with respect to the conjecture model 500a, the set of rule-patterns may include the rule-patterns 111 and 118 of FIGS. 1B and 1C, respectively. Additionally, the set of rule-patterns may be ordered based on specificity in which the rule-pattern 118 may be prioritized over the rule-pattern 111 because the rule-pattern 118 may be more specific than the rule-pattern 111, as described above.

Per blocks 408 and 410 of the method 400, the computing system 104 may determine the unexecuted paths of the conjecture model 500b and may compute priority weights for the unexecuted paths of the conjecture model 500b. In the illustrated example, the priority weights may be determined based on the number of incoming edges with respect to the states of the unexecuted paths.

Per blocks 412, 414, and 416, the computing system 104 may first retrieve the rule-pattern 118 from the set of rule-patterns and may determine whether any paths in the conjecture model 500b match the rule-pattern 118. In the illustrated example, a path 503 of the conjecture model 500b that follows the action sequence "'NEAREST'→'TOGGLE'→'BACK'" may match the rule-pattern 118. Per block 418, the computing system 104 may retrieve the path 503 that matches the rule-pattern 118. In the illustrated example, block 420 may be skipped, because the path 503 may be the only path that follows the rule-pattern 118.

Per blocks, 422, 424, and 426, the computing system 104 may determine whether the path 503 is inconsistent with the sample application 201. In the illustrated example, the path 503 may be inconsistent with the sample application 201. Therefore, the computing system 104 may output the path 503 as an inconsistency with respect to the sample application 201.

Based on the inconsistency associated with the path 503, in some embodiments, the computing system 104 may return to method 300 and may generate a new conjecture model per blocks 310, 312, and 306. In some embodiments, the computing system 104 may output the model 200 of FIG. 2A as the conjecture model. The computing system 104 may then apply the method 400 to the model 200 and may determine that the model 200 is substantially equivalent to the sample application 201. As such, the computing system 104 may output the model 200 as a DFSM model of the sample application 201.

The above description with respect to the sample application is merely an example and is not meant to be limiting. Additionally, the order of steps performed is merely exemplary. The steps and processes involved may be performed in differing orders and may include more or fewer steps.

One skilled in the art will appreciate that, for these and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

As indicated above, the embodiments described herein may include the use of a special purpose or general purpose computer (e.g., the processor 108 of FIG. 1) including various computer hardware or software modules, as discussed in greater detail below.

Further, as indicated above, embodiments described herein may be implemented using computer-readable media (e.g., the memory 110 of FIG. 1) for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:

receiving a model of a graphical user interface (GUI) based application, the model include s a plurality of states that represent states of the GUI-based application and the model includes a plurality of paths that indicate observed behavior of the GUI-based application in which each of the plurality of paths includes one or more transitions between two or more states of the model that indicate a sequence of one or more actions performed on the GUI-based application that result in the one or more transitions;

determining that one or more paths of the plurality of paths of the model each include a particular series of transitions between states of the model with a pattern that satisfies a rule-pattern in which satisfaction of the rule-pattern indicates potential inconsistencies in the model with respect to actual behavior of the GUI-based application, wherein the potential inconsistencies are based on at least one of hidden behavior present in the one or more paths and multiple states of the GUI-based application being represented by a single state in the model;

determining an order of the plurality of paths for determining whether the one or more paths are consistent with the GUI-based application over other paths of the GUI-based application by applying a priority weight to the one or more paths, wherein a higher priority weight for the order is given to the one or more paths over the other paths based on the one or more paths including the pattern that satisfies the rule-pattern and the higher priority weight is given to the one or more paths over the other paths based on a number of incoming edges associated with one or more states of the one or more paths being greater than the number of incoming edges associated with one or more states of the other paths; and verifying whether the model is consistent with the GUI-based application based on the determined order of the plurality of paths.

2. The method of claim 1, wherein the one or more paths are one or more first paths, the pattern is a first pattern, and the rule-pattern is a first rule-pattern, and the method further comprises:

determining that one or more second paths of the plurality of paths of the model each include a second pattern that satisfies a second rule-pattern, the second rule-pattern is based on the second pattern indicating potential inconsistencies in the model with respect to actual behavior of the GUI-based application; and verifying whether the model is consistent with the GUI-based application based on a prioritization of determining whether the one or more second paths are consistent with the GUI-based application, the prioritization of the one or more second paths is based on determining that the one or more second paths each include the second pattern that satisfies the second rule-pattern.

3. The method of claim 2, further comprising prioritizing determining whether the one or more second paths are consistent with the GUI-based application over determining whether the one or more first paths are consistent with the GUI-based application.

4. The method of claim 3, wherein prioritizing determining whether the one or more second paths are consistent with the GUI-based application over determining whether the one or more first paths are consistent with the GUI-based application is based on the second rule-pattern being more specific than the first rule-pattern.

5. The method of claim 1, wherein the rule-pattern includes a particular sequence of actions that results in a first transition from a first state of the model to a second state of the model followed by a second transition from the second state to a third state of the model followed by a third transition from the third state to a fourth state of the model where the second state and the third state include the same potential actions.

6. The method of claim 1, wherein the rule-pattern includes a particular sequence of actions that results in a first transition from a first state of the model to a second state of the model followed by a second transition from the second state to a third state of the model followed by a third transition from the third state back to the second state.

7. One or more non-transitory computer-readable storage media including computer executable instructions configured to cause a system to perform operations to verify a model of a graphical user interface (GUI) based application, the operations comprising:

receiving a model of a graphical user interface (GUI) based application, the model include s a plurality of states that represent states of the GUI-based application and the model includes a plurality of paths that indicate observed behavior of the GUI-based application in which each of the plurality of paths includes one or more transitions between two or more states of the model that indicate a sequence of one or more actions performed on the GUI-based application that result in the one or more transitions;

determining that one or more paths of the plurality of paths of the model each include a particular series of transitions between states of the model with a pattern that satisfies a rule-pattern in which satisfaction of the rule-pattern indicates potential inconsistencies in the model with respect to actual behavior of the GUI-based application, wherein the potential inconsistencies are based on at least one of hidden behavior present in the one or more paths and multiple states of the GUI-based application being represented by a single state in the model;

determining an order of the plurality of paths for determining whether the one or more paths are consistent with the GUI-based application over other paths of the GUI-based application by applying a priority weight to the one or more paths, wherein a higher priority weight for the order is given to the one or more paths over the other paths based on the one or more paths including the pattern that satisfies the rule-pattern and the higher priority weight is given to the one or more paths over the other paths based on a number of incoming edges associated with one or more states of the one or more paths being greater than the number of incoming edges associated with one or more states of the other paths; and verifying whether the model is consistent with the GUI-based application based on the determined order of the plurality of paths.

8. The one or more non-transitory computer-readable storage media of claim 7, wherein the one or more paths are one or more first paths, the pattern is a first pattern, and the rule-pattern is a first rule-pattern, and the operations further comprise:

identifying one or more second paths of the plurality of paths of the model that each include a second pattern that satisfies a second rule-pattern, the second rule-pattern is based on the second pattern indicating potential inconsistencies in the model with respect to actual behavior of the GUI-based application; and verifying whether the model is consistent with the GUI-based application based on a prioritization of determining whether the one or more second paths are consistent with the GUI-based application, the prioritization of the one or more second paths based on the one or more second paths each include the second pattern that satisfies the second rule-pattern.

9. The one or more non-transitory computer-readable storage media of claim 8, wherein the operations further comprise prioritizing determining whether the one or more second paths are consistent with the GUI-based application over determining whether the one or more first paths are consistent with the GUI-based application.

10. The one or more non-transitory computer-readable storage media of claim 9, wherein prioritizing determining whether the one or more second paths are consistent with the GUI-based application over determining whether the one or more first paths are consistent with the GUI-based application is based on the second rule-pattern being more specific than the first rule-pattern.

11. The one or more non-transitory computer-readable storage media of claim 7, wherein the rule-pattern includes a particular sequence of actions that results in a first transition from a first state of the model to a second state of the model followed by a second transition from the second state to a third state of the model followed by a third transition from the third state to a fourth state of the model where the second state and the third state include the same potential actions.

12. The one or more non-transitory computer-readable storage media of claim 7, wherein the rule-pattern includes a particular sequence of actions that results in a first transition from a first state of the model to a second state of the model followed by a second transition from the second state to a third state of the model followed by a third transition from the third state back to the second state.

* * * * *